United States Patent [19]

Klein

[11] 4,395,332

[45] Jul. 26, 1983

[54] ADSORPTION AND FILTRATION MAT FOR LIQUIDS

[75] Inventor: Max Klein, 257 Riveredge Rd., Tinton Falls, N.J. 07724

[73] Assignees: Max Klein; Frederick G. Crane, Jr., both of Dalton, Mass.

[21] Appl. No.: 258,443

[22] Filed: Apr. 28, 1981

Related U.S. Application Data

[63] Continuation of Ser. No. 66,085, Aug. 13, 1979, abandoned, which is a continuation-in-part of Ser. No. 922,656, Jul. 7, 1978, abandoned.

[51] Int. Cl.³ .............................................. B01D 39/08
[52] U.S. Cl. ..................................... 210/496; 210/502; 210/505
[58] Field of Search ............... 162/168 R, 168 N, 169, 162/146, 164.1, 164.6, 164.7, 181.5, 181.6, 181.8, 181.9; 210/500.1, 501–503, 505, 679, 692–694, 496, 508; 428/240, 244

[56] References Cited

U.S. PATENT DOCUMENTS

| | | | |
|---|---|---|---|
| 3,246,767 | 4/1966 | Pall et al. | 55/521 |
| 3,252,270 | 5/1966 | Pall et al. | 210/505 |
| 3,327,859 | 6/1967 | Pall | 210/502 |
| 3,420,709 | 1/1969 | Barrett et al. | 210/502 |
| 3,494,826 | 2/1970 | Scheiber | 162/164.6 |
| 3,657,125 | 4/1972 | Strickman | 210/40 |
| 3,960,722 | 6/1976 | Tomikawa et al. | 210/502 |

FOREIGN PATENT DOCUMENTS

| | | |
|---|---|---|
| 834757 | 5/1960 | United Kingdom . |
| 857988 | 1/1961 | United Kingdom . |
| 922306 | 3/1963 | United Kingdom . |
| 1058932 | 2/1967 | United Kingdom . |
| 1118221 | 6/1968 | United Kingdom . |
| 1364762 | 8/1974 | United Kingdom . |

*Primary Examiner*—Ivars C. Cintins
*Attorney, Agent, or Firm*—Dann, Dorfman, Herrell and Skillman

[57] ABSTRACT

Disclosed are filter mats composed of a wet laid, porous, non-woven matrix having randomly arranged, irregularly intersecting and overlapping cellulose fibers intermixed as a cobeat (i.e. beaten together) with micro-bits of an expanded, thermoplastic styrene-polymer or lower polyolefin or of a flexible foamed polyurethane, and which mix also can include any one or more additional such micro-bits and of fiber-forming polyethylene terephthalate polyester fibers, finely divided activated carbon, diatomaceous earth, and colloidal alumina monohydrate. These mats are effective, for example, to remove insoluble particles and/or soluble substances present in liquid, presently primarily aqueous, media particularly in minute amounts, such as undesirable substances in industrial plant waste waters.

18 Claims, No Drawings

ADSORPTION AND FILTRATION MAT FOR LIQUIDS

This is a continuation of application Ser. No. 066,085 filed Aug. 13, 1979, which, in turn, is a continuation-in-part of application Ser. No. 922,656, filed July 7, 1978 both now abandoned.

BRIEF DESCRIPTION OF THE INVENTION

This invention is that of certain porous, non-woven media generally referred to as adsorption and filtration mats for liquids or liquid use adsorption and filtration mats. These mats are prepared by paper making equipment and procedures from and composed of at least the two specific basic constituents mentioned shortly below. These mats have a porosity effective to retain from liquids filtered through them finely divided particles of as low as 0.5 micron and less in size while at the same time providing maintained good flow-through rates of liquid mixtures being filtered. In other embodiments having any one or more or all four, other ingredients, these filter mats in addition are capable of adsorbing from liquid media (inert to the mat constitution) many substances dissolved or colloidally or otherwise dispersed in such media even when present therein in few parts per million or even in parts per billion, such as contaminants, as from industrial waste waters, in rivers and streams or in drinking water.

The liquid use adsorption and filtration mats of the invention basically have a matrix, (i) the structural integrity of which primarily is provided by cellulose fibers such as of paper, and better yet writing paper, grade, and (ii) the enhanced porosity of which is provided by micro-bits (below more fully described) of an expanded, thermoplastic styrene-polymer or lower polyolefin or of a flexible foam polyurethane. The matrix wet strength (during the mat production) and its tensile strength in the use can be enhanced by adding fibers of a fiber-forming polyethylene terephthalate polyester as a third ingredient. Finely divided activated carbon can be added as a further ingredient as a principal adsorbing agent. Diatomaceous earth can be included as a different absorbing agent (still another ingredient) to take part in enhancing the porosity, although adding more polymer micro-bits can replace the diatomaceous earth for that latter purpose. A still further applicable adsorbing agent ingredient that can be included is the colloidal alumina monohydrate (AlOOH) product described in U.S. Pat. No. 2,915,475.

BACKGROUND OF THE INVENTION

Many undesirable waste liquids such as industrial plant waste waters effluent containing toxic substances and also effluent from municipalities sewage disposal plants, which contain unremoved undesirable particles and even minute quantities of dissolved toxic substances, are disposed of by being fed into nearby streams and rivers, thereby causing well known serious contamination problems, which are particularly of concern with drinking water.

Thus far, granulated activated carbon appears to be the most frequently used product to overcome the problem, for example, by removing soluble and insoluble impurities. For that these waste waters are passed through large columns of this activated carbon enclosed in vertical cylindrical tasks ranging, for example, from 10.7 to 15.2 decimeters high by 3.7 decimeters or so in diameter. It is indicated that the required rate of passing waste water through such activated carbon columns to remove, for example, a trihalomethane such as chloroform requires a residence time of about 45 minutes of the water from entry to leaving the cylinder tank. The providers of this system report that the residence time for removal from water of benzene is 55 minutes, for phenol up to 165 minutes, and for chlorinated aromatic compounds extends to 21 hours, to obtain in some cases only a 50% reduction.

Then too, the useful time in which the activated carbon can adsorb chloroform is not as long as is desired in light of the capital investment in the tank and the large volume of the carbon (said to be 88 cents to $1.76 per kilo) to fill the tank and the need to have on hand another such tank for use while the first one is shut down for regenerating the carbon. That entails further cost for burning off the adsorbed organic contaminants (from the pores of the carbon granules), as by regeneration in a multiple-hearth furnace, and also of carbon lost in the regeneration. That latter loss is said by providers of the system to be about 10% although users report such loss to be higher in some cases up to 50%.

Such capital cost in the installation and regeneration equipment in the granulated activated carbon system has been said to be a serious burden. Then too, there is reported a further problem from bacterial growth inside of the adsorbers. Moreover, in operation, the granular carbon system is amenable to any high surge occurrence in the liquid stream fed to the granular carbon system and when such surges occur too frequently, that can upset the use of the system.

Certain industrial operations require the removal of low micron size particles and even sub-micron size particles. A number of synthetic organic membranes, and at least one inorganic membrane are available for such filtrations. However, they are quite costly such as from about a dollar to about $15 and even much more, per 929 square centimeters and also involve a considerably low flow rate. Such membrane filters made, for example, from regenerated cellulose, cellulose acetate, or mixtures of it and the triacetate, cellulose esters, and of polyvinyl chloride are said to be prohibitively expensive for use in treating industrial plant wastes effluent streams. Use of such membranes in the foregoing liquid treatments is then said to be prohibitively costly.

The more recently introduced hard, non-dusting, carbonaceous, black spherical adsorbents are quite costly (about $26 per kilo). They also require fixed-bed column operation involving backwashing for removal of filtered out suspended solids. They too can be regenerated as by treatment with water-miscible and water immiscible solvents, steam, acids, or bases and at elevated temperatures at added cost.

The foregoing shortcomings and disadvantages of these granular activated carbon beds, black spherical carbonaceous adsorbents, and synthetic membranes are avoided by the adsorption and filtration mats for liquids, of this invention, for they provide considerable savings both in cost and operation conduct and time. Regeneration is avoided in that their low cost justifies replacement instead.

Considered broadly, the liquid use adsorption and filtration mat of the invention is a wet laid, non-woven matrix composed of randomly arranged, irregularly intersecting and overlapping particles consisting essentially of (i) cellulose fibers in an amount sufficient initially to provide the wet strength of the matrix during the flat wet stages of the production of the mat and to retain the integrity or continuity of the mat under the tensile stress which it is to encounter in use; and (ii) micro-bits selected from the group consisting of
  (a) an expanded, thermoplastic styrene-polymer,
  (b) an expanded lower polyolefin i.e., a polymer of an ethylenically unsaturated hydrocarbon monomer having from 2 to 6 carbon atoms such as ethylene, a propylene, butylene, pentene or methylpentene,
  (c) a copolymer of propylene with from about 20 to about 30 percent by weight of ethylene,
  (d) a melt alloy of polyethylene with up to about 10 percent by weight of polystyrene,
  (e) a melt alloy composed of at least 50 percent by weight of polypropylene and the balance being a copolymer of ethylene with up to about 30 percent (of the copolymer) being vinyl acetate, and
  (f) a flexible foamed polyurethane,
each said polymer being non-brittle in its starting expanded form and said micro-bits derived therefrom being present in an amount sufficient to provide the mat with the degree of porosity and flow-rate level required for the application wherein the mat is to be used; and may optionally, include any of (iii) the fibers of a fiber-forming polyethylene terephthalate polyester in at least an amount (a') that jointly with the cellulose assures having the extent of wet strength of the mat necessary in providing its wet laid formation and maintains sufficient mat strength through its drying stage, and (b') that jointly with the cellulose provides sufficient tensile strength for the mat to have in its proposed use, and below that amount at which the polyester particles used in producing the mat start to agglomerate while being admixed with the other constituents in the formation of the mat and (iv) an adsorbing agent selected from the group of
  (a) finely divided activated carbon in an amount below that at which undesirable dusting of finely divided carbon from the mat can occur;
  (b) diatomaceous earth, to serve as a further ingredient with the micro-bits enhancing the desired porosity, and in an amount below that at which undesirable dusting of diatomaceous earth from the mat can occur; and
  (c) the colloidal alumina monohydrate. Mixtures of two or more of these adsorbing agents may be incorporated in the filter mat.

It is highly advantageous to enable providing the best level of maintained matrix integrity in the mats of the invention that, as an initial step in producing the mat, the cellulose fibers and micro-bits be prepared jointly as what is called a cobeat and composed beneficially of about one part of micro-bits and from about one to about two parts of the cellulose fibers, as described further below.

The liquid use adsorption and filtration mats of the invention can be used (a) in filtering many different types of liquid media containing varying amounts and sizes of various discrete particles and particulate substances (so long as the liquid vehicle is inert to the mat's constitution) and (b) for treating such liquid media and others lacking any discrete particles but containing colloidally dispersed particles and/or substances dissolved usually and especially in low concentrations even (as little as a small number of parts per million or even as little as parts per billion) for adsorbing from such liquid media the colloidally dispersed and/or dissolved substances.

Such liquids could be waste effluent streams discharged from a great variety of industrial operations into streams or collection tanks for one purpose or another or from a wide variety of chemical operations using water or organic solvents (inert to the mats of the invention) for treatment to remove particulates or colloidally dispersed or dissolved substances and enable the liquid vehicle to be reused.

Such extensive variety of applications may require selections from a multitude of different qualitative and quantitative contents of mats. Accordingly, it is difficult to state a specific range of content for each of the two basic constituents (the cellulose and polymer micro-bits) of the mats of the invention or any of the other optional additional ingredients which these mats can include.

Then the numerical range of content of each of the different constituents thus can be indicated only roughly, with the recognition that the function which each of them serves in the production of the mat and its planned application influences the respective possible specific minimum and maximum of each of them.

The cellulose thus should be present in an amount at least sufficient to enable retaining the structural integrity or continuity of the mat while preparing its initial wet laid formation and to its dry state and in the use to be made of the mat, and to hold the content of the particulate material in the mat. That is accomplished with the cellulose used in a range of from about 10% to about 95% of the mat total solids.

The micro-bits serve primarily to provide the desired porosity in the finished mat and in a measure to partake in holding particulate material included in the mat. Micro-bits then can make up from about 2% to about 90% of the mat solid content.

To serve to maintain the mat web integrity during the wet laid formation and on to and through the drying and in the finished state, the polyester can be included at from about 1% to 10% of the total of the solid ingredients of the mat, and more effectively at about 5%, and better still at about 7%, of their total.

Finely divided activated carbon particles should be not less than about one micron to no larger than about 100 microns and used in an amount up to about 70% of the total solids and below that at which undesirable dusting of carbon particles occurs.

Diatomaceous earth can be used at up to about 20% of the total solids content and below that at which undesirable dusting of its particles occurs.

The cobeat is so-called because it is provided by beating together cotton fibers and polymer micro-bits in water in a beater. A cobeat suspension is prepared, for example, by agitating 363.6 kg. (dry basis) of wet lap cotton fibers (obtained from cotton rags as used in paper making, having 1454.4 liters of water entrained in the fibers) and 181.8 kilos (dry basis) of polymer micro-bits, e.g. polystyrene (as 6% solids holding 2848.5 liters of bound water), agitated mixture of cotton fibers and polymer micro-bits into 13,354 liters of water in a papermaking beater and continuing agitating for about six hours. That disperses into the water the cotton fibers and the micro-bits free of clumps and clusters and randomly and intimately intermingling them by the breaking open of the cotton fibers apparently enhanced by action of the micro-bits on them with resultant interlocking of individual micro-bit particles in the thus extended fibrillar features of the cellulose.

The polymer micro-bits are characterized as being (a) from about 40 to about 325 microns long and from about 20 to about 325 microns wide, (b) from substantially completely to entirely completely free of intact cells of the expanded polymer bit-pieces from which they were produced, (c) substantially without any uniformity in outline of the individual micro-bits particles, and (d) in density from about 85 percent of, to about substantially the same as, the specific unexpanded polymer from which there was provided the aforesaid expanded polymer.

These micro-bits are produced from so-called bit-pieces of any of the expanded thermoplastic, non-brittle in expanded form polymers of styrene or of lower olefins (as well as copolymers of them with other monomers or melt alloys with other polymers, as illustrated shortly above) as starting materials.

By "bit-pieces" is meant any of the discrete free-flowing forms of any of these starting materials, such as (i) the various sizes of granules made by cutting the respective extruded polymer into fairly small lengths usually called pellets or granules (as with a styrene-polymer) or pellets or cubes of a polyethylene-polystyrene alloy, (ii) the various sizes of styrene-polymer beads obtained from suspension polymerization or otherwise as by molding the particles obtained by disintegrating any of these different polymer forms, (iii) the so-called "grind" including the coarsely ground molded polymer or waste or other scraps of such polymer of various sizes, e.g., 3.175 millimeter (i.e. mm.) thick, 6.35 mm. wide, and 9.535 mm. long, and (iv) any other small sized shapes of any of them.

The preparation and properties of flexible polyurethane foams are described, for example, in the "Handbook of Foamed Plastics", Bender, Rene J., Section X, pp. 173-236, Lake Publishing Corporation, Libertyville, Ill., U.S.A. (1955), "Polyurethanes: Chemistry and Technology", Saunders & Frisch, Chapter VII, Part II, Interscience Publishers, New York, N.Y., U.S.A. (1964), and "The Development and Use of Polyurethane Foams", Doyle, E. N., pp. 233-256, McGraw Hill Book Company, New York, N.Y., U.S.A. (1971).

The flexible polyurethane foams useful to provide foamed polyurethane micro-bits preferably should be no greater than 96 gm. per liter in density, beneficially ranging from about 48 to about 16 gm. per liter, and show excellent recovery after 75% deflection with approximately less than 1% loss in height (as determined by American Society of Testing Materials D-1564-64T).

The flexible foam polyurethanes are not obtained in the form of bit-pieces as are the styrene-polymers and lower polyolefins, but rather in continuous foamed blocks as a result of the reaction that provides the polyurethane. Accordingly, the foamed polyurethane blocks first are shredded into bit-pieces (for example, similar to how they may be prepared for use in stuffing into various articles).

The polyurethane micro-bits are more fully described as comprising broken and interconnected strand portions from adjacent cells of the flexible foam, which strand portions show substantially total absence of intact cells and cell windows and are tripodal particles with generally uneven length legs, the strand portions having hook-like projections, indentations and flutes resulting from destruction of the cells and cell windows of the starting flexible foam.

Any of these micro-bits are prepared by disintegrating the respective starting expanded polymer bit-pieces in a comminuting machine such as that produced by Fitzpatrick Company (of 832 Industrial Drive, Elmhurst, Ill. 60120, U.S.A.) according to their Bulletin No. 152 copyright 1968, using the broached fixed blades (identified therein by "Code DS225") to replace the blades or other comminuting elements, mounted for rotation in the comminuting chamber model DAS06, both shown on that bulletin's page 5. That chamber is liquid-tightly capped, for example, by a cover such as shown in their code M44D6 or Code MA44D6 (upper half of page 3 of their Bulletin 152).

That model DAS06 comminuting chamber is rectangular in horizontal cross-section and has a pair of opposed parallel entirely vertical walls integrally joined at each of their opposite ends by a separate one of a pair of opposed vertically arcuate walls each with its convex face exposed to the exterior.

Sixteen identical, slat-shaped comminuting arms are separately removably but fixedly carried with their snugly adjacent to one another bases encircled about, and keyed to, the operating shaft and intermediate its free outer mounting ends. These arms extend radially out from the shaft (e.g. 127 mm. from its axis to the outer end of each arm) with the first of each consecutive four of them extending horizontally toward one arcuate wall, the second of each four extending vertically, the third four of them extending toward the other arcuate wall, and the fourth four of them extending vertically downward.

Each arm is rectangular in cross-section in a plane running through the entire length of the shaft's axis and of that arm, and of each arm 180° removed from it. The outer end of each arm meets at right angles with its two wider sides (5.4 mm. width) and its narrow or impact side (9.525 mm. wide) facing the direction of rotation. The narrow side also meets at right angles with the two wider sides which are parallel to one another for most of their width and with the trailing third of their surfaces tapering to one another and terminating in the knife edge of their trailing end.

Each free exposed end of the shaft extends through its respective stuffing box in its neighboring one of the two parallel vertical walls on through a bearing carried on a respective trunnion affixed to the machine's foundation and spaced outwardly away from the respective wall. A driving pulley is mounted on each end of the shaft extending outwardly from its respective mounting trunnion.

The bottom of the comminuting chamber is an exchangeable dish-shaped, arcuate screen curved convexly downward with an inside radius (from the axis of the operating shaft) equal to the length of a comminuting arm plus 0.762 mm. clearance. The screen's overall rectangular peripheral opening has such dimensions and shape as to enable it to be removably fitted in a liquid-tight engagement with the bottom of the four walls of the comminuting chamber.

The screen has staggered rows of, for example, circular holes varying in diameter from 0.102 to about 3.175 mm. and closely spaced to one another yet with sufficient space between them for the screen to hold up under working conditions.

Except for its starting material feed hopper inlet at one side of it, the rest of the chamber's cover is arcuate and convex upwardly with a radius (from the axis of the operating shaft) sufficient for the rotating arms to have a 0.762 mm. clearance from the inwardly facing surfaces of a plurality (e.g. three) pre-breaker bars (about 20.32 cm. long and 6.35 mm. wide) protruding for 3.175 mm. along their entire length into the interior of the comminuting chamber, and extending spaced apart from one another and parallel to the axis of the operating shaft.

The selected driving pulley on the operating shaft is connected by driving belts extending from a motor shaft drive pulley and can be operated at speeds embracing the range of from about 4700 to about 8000 r.p.m., and more effectively from about 5000 to about 7500 r.p.m.

The preparation of any of the polymer micro-bits from starting bit-pieces of any of the respective starting polymers is illustrated in, but not restricted to, the following preparations of polystyrene micro-bits:

EXAMPLE A

Micro-Bits From Expanded Extruded Polystyrene Pellets 425 liters of expanding-agent-impregnated, extruded polystyrene pellets (crystal) expanded to from about 6.35 to about 12.7 mm. substantially round pellets having a bulk density of 12 grams per liter were comminuted in a comminuting machine (as described earlier above) equipped with an input feeder 10.16 cm. in diameter by 7.62 cm. long and a bottom arcuate screen with holes of 0.1016 mm. diameter.

The rotor was set to run at 6,000 r.p.m. and the feeder set to charge the expanded polystyrene bit-pieces at the rate of 35.4 liters every 5 minutes (i.e. 425 liters per hour). The starting expanded polystyrene bit-pieces to be introduced into the feeder were wetted with sufficient water substantially completely to cover their outer surfaces. The thus wetted expanded polystyrene bit-pieces were charged into the feeder continuously at a rate of 35.4 liters every 5 minutes, while at the same time water was injected into the comminuting chamber through the two 1.6 mm. diameter jet orifices at a rate of 7.57 liters per minute.

The mixture of the polystyrene micro-bits leaving the screen bottom of the comminuting chamber was collected in an open tank with a bottom drain plug, wherein the free water settled to the bottom and the polystyrene micro-bits with the bound water held by them (in the proportion of 2 parts of micro-bits to 98 parts of water), due to the entrapped air, rose on the top of the free water. The free water was drained off leaving behind a plastic mass of the resulting polystyrene micro-bits in the water physically bound to them. The plastic mass weighed 255.15 kilos and contained 5.1 kilos of micro-bits with 250.05 kilos of water bound by them.

27.24 kilos of this plastic mass, placed in a close weave double cotton bag, then were subjected to pressure until 22.71 liters of water were expressed. The remaining 4.08 kilos containing 544 grams of expanded polystyrene micro-bits then were dried in an open dish in an oven maintained at 43.33° C.

Micro-bits of any of the other herein applicable polymers are prepared by repeating Example A but replacing its starting polystyrene bit-pieces by those of any of these other applicable expanded polymers. Thus, each such repeat of Example A starting with the micro-bits of each such other applicable expanded polymer is to be considered as if incorporated herein in full as a separate example, thereby avoiding unnescessarily extending this specification.

The liquid use adsorption and/or filtration mats of the invention and their preparation are illustrated by, but not restricted to, the following examples carried out by the method of preparing usual hand sheets as in the paper-making laboratory by using an ordinary hand sheet mold (having a 20.3 cm. square base and 28 cm. high):

EXAMPLE 1

Mat Of Cellulose And Micro-Bits 3.6 gm. (dry basis) of cellulose in the form of the earlier above described wet lap cotton fibers (from cotton rag) and 7.2 gm. (dry basis) of polystyrene micro-bits were charged into about 2000 ml. of water in a stainless steel beaker (of 3000 ml. capacity) while agitating with a laboratory helical type stirrer until a uniform dispersion was attained (within about 3 minutes) as a smooth, very fluid slurry. This slurry then was poured rapidly into the hand sheet mold already containing about 8000 ml. of water above its hand sheet screen. The drainage valve then was opened and the water allowed to run out until no free water remained on top of the formed mat.

The hand sheet screen holding the thus formed mat then was lifted out and passed over a vacuum slit to withdraw loose water from within the mat. Then the screen holding the mat was sandwiched between absorbent blotters, 3 under the screen and 3 on top of the mat and thus was pressed in a laboratory hydraulic platen press until the meter showed a pressure reading of about 409 kg. The mat then was separated from the screen and set on the hot plate dryer at 120° C. until the hand sheet reached constant weight.

A 6 cm. diameter disc cut from this hand sheet was clamped ub a Seitz ® filter and under 38.1 cm. Hg vacuum distilled water passed through the disc in 17 seconds. 100 ml. of hazy, tan to light brown, odorous final effluent, turbidity 44 JTU (i.e. Jackson Turbidity Units) on a Hach turbidimeter, discharged from a city waste water treatment plant then similarly was filtered through the same disc in 20.8 seconds. This filtrate showed a turbidity of 10 JTU (considered to be clear since drinking water turbidity also is 10 JTU).

EXAMPLE 2

Example 1 Mat And Polyester 6.8 gm. of cellulose (from rag) and 3.4 gm. of polystyrene micro-bits, both as cobeat, and 0.84 gm. of TREVIRA ® polyester (identified further below) and 650 ml. of water were agitated in the Waring Blender for a minute (which is sufficient to attain uniform dispersion). 40 ml. of this blender slurry were admixed into 1500 ml. of water in the 3000 ml. stainless steel beaker while agitating with the helical type stirrer. Within seconds uniform dispersion was complete providing a smooth, very fluid dispersion.

Into the stainless steel beaker and while the dispersion still was under agitation and uniform and with continuing the agitation, there was admixed 0.3 gm. of the polyester and then the remainder of the initial slurry of rag cellulose, micro-bits and polyester were added and agitation of the complete uniform slurry was continued for a couple of minutes. This slurry then was poured rapidly into the hand sample mold containing the sme quantity of water as in Example 1 and a hand sheet mat then was formed and dried as in that example. The dried mat was 25 mils thick.

A 6 cm. diameter disc cut from this mat was clamped in the same Seitz ® filter. 100 ml. of an aqueous solution of the Ponsol base blue dye (used in paper making) having turbidity of 100 JTU (by the Hach meter) was poured onto the disc in the filter and (under the same vacuum) filtered through in 90 seconds. The turbidity of the filtrate was 11 JTU (colorless to the eye, considered clear because of its proximity to 10 JTU for drinking water).

EXAMPLE 3

Example 1 Mat Plus Polyester And Activated Carbon

By the procedure as in Example 2, a mat was prepared by charging 6.8 gm. of (rag) cellulose, 3.4 gm. of the micro-bits, 0.84 gm. of the polyester, and 4.7 gm. of finely divided activated carbon (NUCHAR ® S-N) with agitation in 650 ml. of water in the Waring blender for a minute or so to provide a uniform dispersion and then were further processed as in Example 2 to provide the final mat containing these four ingredients.

100 ml. of the same final effluent from a city waste water treatment plant, as used in Example 2, filtered (under the same vacuum) through a 6 cm. diameter disc cut from this mat and clamped in the Seitz ® filter, yielded in 63.5 seconds a colorless filtrate which showed a turbidity of 6 JTU (by the Hach meter).

EXAMPLE 4

Kraft Mill Final Effluent On Example 3 Mat

It has long been recognized to be very difficult to rid the very dark brown final aqueous effluent from a kraft paper mill of its undesirable very dark brown character, although lately an involved costly extensive area process has been considered. 100 ml. of the very dark brown final effluent, showing an initial turbidity of 150 JTU, was filtered through 5 thicknesses of the 6 cm. diameter discs cut from a hand sheet prepared by the procedure as in Example 3 from 3.4 gm. of (rag) cellulose, 2.3 gm. of micro-bits, 0.3 gm. of the polyester and 10 gm. of the finely divided activated carbon (equal to 62.5% of the total solids). The resulting filtrate from 100 ml. of this effluent drawn through 5 layers of 6 cm. diameter discs (clamped in the Seitz ® filter and under same vacuum) completed in 90 seconds tested 3 JTU by the Hach turbidimeter. This filtrate then was passed through the same 5 layers of this mat in 50 seconds and showed a turbidity reading of zero.

EXAMPLE 5

Mat Of Example 2 Plus Diatomaceous Earth

A hand sheet mat was prepared from 6.8 gm. of cellulose, 3.4 gm. of micro-bits, 0.84 gm. of the polyester, all as in Example 2 and by its procedure with the addition that in the dispersion in the stainless steel beaker there was admixed 4.7 gm. of diatomaceous earth (HIGH FLOW SUPERCEL ®), and the hand sheet mat was completed as in Example 2. 100 ml. of an aqueous solution of the Ponsol base dye having a turbidity of 124 JTU passed through a 6 cm. diameter disc of this mat clamped in the Seitz ® filter under the same vacuum yielded in 130 seconds its filtrate which showed a turbidity of 10 JTU (colorless to the eye, and thus clear) by the Hach meter.

The following illustrative example was run with paper making steps and paper making equipment:

EXAMPLE 6

Mat Of Cellulose, Polymer Micro-Bits, Polyester, Carbon And Diatomaceous Earth

Into a paper-making pulper (the E. D. Jones, Pittsfield, Mass., U.S.A., No. 3HI-LOW) containing 7570 liters of water, equipped with its so-called defibering rotor (76 cm. diameter) running at 800 r.p.m. and delumping and circulating rotor (diameter 1143 cm.) rotating at 218 r.p.m., there was charged 685.7 kilos (kg.) of wet bleached cotton half stock (so-called wet lap rag cotton fibers used in paper making) 589.7 kg. (dry basis) at a location initially to be propelled by the delumping and circulator rotor and to continue in a circular path for a period of 10 minutes to be dispersed as separated fibers in substantially clump-free state by the difibering rotor into a homogeneous slurry. The resulting slurry then was pumped to the beater with its beating roll (182.9 cm. diameter and 182.9 cm. width) rotating at 118 r.p.m.

In this beater slurry there was admixed 317.52 kg. (dry basis) of polystyrene micro-bits as 12% of the total water-bound product (holding 2328.5 liters of water). The pulping was continued for 10 minutes providing a homogeneous mixture which then was pumped to a (E. D. Jones Bertram) beater having three bed plates each 104.2 cm. long by 33.66 cm. wide each with 19 bars 4.77 millimeters (mm.) wide and 6.4 mm. deep and spaced 12.7 mm. apart. The resulting slurry (containing 907.2 kg. solids) at a consistency of 4.4% was refined with the beater at 90% pressure until the slurry attained in freeness of 500 (by Schopper Riegler tester) in about 6 hours.

The 208.2 liters of the beater slurry then was transferred to the beater chest and mixed (by 2 horizontal propeller agitators at 303 r.p.m.) while adding 45,420 liters of water while agitating. To the resulting diluted suspension then was admixed 43.36 kg. of semi-dull, optically whitened polyethylene terephthalate polyester as 1.27 cm. long fibers (of 1.5 denier) spun by conventional melt process, having a special finish compatible with most anionic, cationic or nonionic binders (and providing rapid and excellent dispersion with a wide variety of furnish systems and additives), and solution viscosity of 770±20 of ½ gram dissolved in 50 ml. of solvent (by weight, 40 parts tetrachloroethane and 60 parts phenol) at 25° C. (solution viscosity is the viscosity of the polymer solution divided by the viscosity of the solvent, with the result minus one multiplied by 1000); melting point 48.67° C., non-shrinkable in boiling water, and elongation at break 45% (available as TREVIRA ® 101, product of American Hoechst Corporation, Fibers Division, Spartenburg, S.C. 29301).

Ten minutes after addition of the polyester, there was admixed 113.4 kg. of diatomaceous earth (HI-FLOW SUPERCEL), 127 kg. of finely divided activated carbon black (NUCHAR S-N ®, product of Westvaco Corporation, Covington, Va. 24426, U.S.A.) and also 443.2 kg. of the refined beater slurry. Sufficient water then was added to provide a consistency of 0.58%. Thereafter the homogenous further diluted dispersion was transferred to the machine chest (used in paper making to hold stock that is to be fed to the head box from which the dispersion is fed onto the Fourdrinier).

From the machine chest the final diluted slurry on its way to the head box was passed through a stock pump which at 1170 r.p.m. propelled the slurry on past an electronic in-line consistency sensor equipped to send a signal to a controller which by initiating a current to a pneumatic transducer controls the dilution water valve at the stock pump suction point to enable supplying any needed dilution water prior to passing another consistency sensor.

The slurry then continued through an in-line magnetic flow meter associated with a magnetic current converter providing a signal to a controller which by a current to an activator transducer to activate a flow valve to regulate flow of slurry (at a consistency of 0.58%) to the fan pump box. The fan pump at 1750 r.p.m., and with facilities for temperature control, raised the temperature of the slurry to 48.5° C. and conveyed the slurry at that consistency and temperature through a magnetic flow meter (similar to the gate flow meter) at 340.7 liters per minute to a Rice Barton open head box.

From there the slurry passing under the head box slice bar was distributed in uniform spread and flow over the traveling Fourdrinier screen, having 78 strands in the travel direction and 50 strands across, and 18.47 meters (m.) long by 2.72 m. wide, and subjected to a side to side machine shake at 160 strokes per minute of 19.1 mm. linear motion per stroke cycle.

In addition to drainage through the screen, water was removed from the slurry as the screen passed over 5 Rice Barton suction boxes (2 of them being near the couch roll, operated at 7.62 cm. Hg) and over the suction couch roll at a vacuum of 53.3 cm. Hg. Slurry (at about 30% dryness) passed from the screen at the couch roll and was picked up by a felt and carried through a first wet press (pneumatically loaded at 1.5 kg. per square cm.) and (at 33% dryness) continued on through a reverse rotation wet press loaded at 2.2 kg. per square cm. There the slurry attained 38% dryness and then passed on into the first steam heated dryer section (equipped with 8 Gardner dryers) felted with Albany 'Dri-Screens'.

The web then continued on to a similar second section of six such dryers with like screens and all equipped with stationary Lodding doctors and with the drying temperature of 132° C. at one atmosphere steam pressure. The finished mat web leaving the latter dryers (at 94% dryness) then was collected on a mat web collecting reel. The operation conducted at the web speed of 21.34 m. per minute produced 765.8 kg. of finished mat per hour, of 226 cm. width and weight of 27.2 kg. per 500 sheets of 43.2 cm. by 55.9 cm. each.

The diatomaceous earth in the Examples 5 and 6 mats (i) enhances filtering out the fine particulate material from its suspension in a liquid filtered through the mats and (ii) takes part apparently to a lesser measure than does the micro-bits in improving the flow rate. Where the mats are to be used in filtering a liquid with which the primary need is removal of the fine particles content and at a reasonably high flow rate, the diatomaceous earth content of the mats should be increased and possibly even up to about 30% of the total solids content.

The colloidal alumina monohydrate is boehmite with the chemical structure A100H, a white powder dispersible in water to form a stable colloidal sol, with ultimate particles being fibrillar crystals about 100 to 1500 millimicrons long by about 5 millimicrons diameter, initially used as an emulsifying and thickening agent.

Including this colloidal alumina monohydrate in the mats of this invention enables them to remove from aqueous media dissolved chromic acid or dichromates, for example, such as are contained in the aqueous effluent discharge from chrome plating plants. This utility is illustrated by, but not restricted to, the following example:

EXAMPLE 7

Mat Containing Colloidal Alumina Monohydrate (a) Hand sheet mats containing the colloidal alumina monohydrate were prepared following the procedure shown in Example 2 from a (materials) furnish having:
5.4 gm. of cobeat wet lap (containing 6% water),
0.2 gm. of the TREVIRA polyester,
20 gm. of polystyrene micro-bits (having 13% solids),
5 gm. colloidal alumina monohydrate powder, and
5 gm. powdered calcium carbonate.

A solution containing 120 parts per million (ppm.) of potassium dichromate in distilled water showed a turbidity of 72 JTU (as found by the Hach turbidimeter) based on the table described further below.

100 ml. of this dichromate solution filtered through a 6 cm. diameter disc (cut from the hand sheet) of the mat of this example held in a Seitz ® filter (as described in the paragraph immediately preceding Example 2) in 55.2 seconds. The first 80 ml. of filtrate appeared colorless to the eye and measured 30 JTU on the turbidimeter. On filtering this filtrate through the same disc the new filtrate, obtained in 37.2 seconds, also showed 30 JTU.

Passing another 100 ml. of that solution through two of the same mat discs at the same time required 115 seconds, yielding an apparently colorless filtrate measuring 25 JTU.

Similarly filtering 100 ml. of that solution through a like disc of Whatman ® No. 5 filter paper gave a colored filtrate showing 70 JTU.

Similarly filtering 100 ml. of distilled water through such disc of the colloidal alumina monohydrate required 53.1 seconds for passage.

Similarly filtering 100 ml. of this dichromate solution through three of these discs at one time gave in 260 seconds a filtrate showing 19 JTU. Then, passing that filtrate through the same three mats in 130 seconds gave its filtrate showing 10 JTU.

(b) Another mat was prepared with the same furnish as that for part (a) of this example except for increasing the colloidal alumina monohydrate content to 10 gm. 100 ml. of a solution of 110 ppm. potassium dichromate in water was filtered in the same way through two discs at the same time in the Seitz ® filter. The first 80 ml. was clear and colorless and the final 20 ml. of filtrate showed 16 JTU. The total time was 131.5 seconds.

(c) For comparison, 100 ml. of solution containing 138 ppm. of potassium dichromate in distilled water (showing 90 JTU) was filtered through a 6 centimeter diameter disc of the activated carbon-containing mat for Example 6 above over 21.5 seconds and showed a reduction in color only to 74 JTU. Passing that filtrate through the same disc resulted in reducing the color only to 72 JTU.

It is difficult to cite a specific range of content of the colloidal alumina monohydrate in the various mats embraced by this invention because the acceptable range of effectiveness varies depending on the differences in the nature of the basic solid constituents in the mat as well as with the changes in the content of whatever other solid materials are included in the mat.

Accordingly, the content of the colloidal alumina monohydrate is best expressed broadly as being a quantity sufficient for effectively removing from an aqueous medium an acceptably significant proportion of the undesirable inorganic material such as chromic acid and/or any dichromates contained in the water. The present indication is that a mat of the invention containing the colloidal alumina monohydrate to the extent of from about 28 to about 44 percent, and optimally about 30.5%, of the mat total solids provides a significantly useful reduction in the chromic acid and/or dichromates content in aqueous media.

In some furnishes lacking the calcium carbonate the wet hand sheet has a tendency to adhere to the screen (in the hand sheet box). That tendency is eliminated by including an amount of the calcium carbonate sufficient to prevent that adherence.

The earlier above referred to table for varying amounts of potassium dichromate in distilled water was obtained by taking separate respective concentrations of it and determining on the turbidimeter the JTU value for each of the concentrations, resulting in the following table:

| 138 ppm. showed | 90 JTU, | 18 ppm. showed | 15 JTU, |
| 49 ppm. showed | 48 JTU, | 9 ppm. showed | 10 JTU, |
| 35 ppm. showed | 28 JTU, | 5 ppm. showed | 6 JTU, |
| | | 3 ppm. showed | 4 JTU. |

One can detect visually a light yellow tint in the solution containing 5 ppm, of the potassium dichromate and showing 6 JTU. However, with the solution containing only 3 parts per million of that dichromate and showing a reading of 4 JTU, the solution appears colorless to the eye, and likewise does a solution containing 1 ppm.

Trivalent chromium also is removed by a mat of this invention. For example, 100 ml. of light green aqueous solution of 200 ppm. of chromic chloride (of 46 JTU turbidity) was passed through the mat of, and as in, Example 7 in about 55 seconds. The filtrate was colorless to the eye and the mat was uniformly green throughout.

The cellulose fibers used in Examples 1 to 3, 5 and 7, as in preparing the cobeat, was cotton fibers such as in their form as wet lap rag cotton, ordinarily containing from about 80% to about 6% of water because of the economy in doing so. Cellulose fibers from any other practical cotton fibers source can be used and even from cotton linters as well as from wood pulp such as that used in preparing writing paper. Any of them can be used in the dry state when thus available or desired for any particular reason. Thus, the cotton fibers in any of these examples as well as in any below indicated further modifications of any of them can be replaced in part or as a whole by cellulose fibers from any of the other applicable sources and each such resulting example is to be considered as if appearing herein in full as a complete example to avoid a prolix disclosure.

The polystyrene micro-bits of Examples 1 to 3, 5 and 7 can be resplaced in part or as a whole by those of any other of the applicable expanded thermoplastic styrene-polymers or lower polyolefins or of flexible polyurethanes each non-brittle in expanded form. Thus, each such repeat of Examples 1 to 3, 5 and 7 by the just indicated replacement of expanded polystyrene micro-bits is to be considered as if occurring herein in full as a complete example, thereby avoiding making this specification prolix. The lower polyolefins from polyethylene to poly-methylpentene include also polypropylene and polybutene.

In any of Examples 1 to 7, and any of the just above indicated modifications of any of them, the micro-bits can be provided with any amount of water held by them. The micro-bits may be provided in these examples to be used along with different amounts of water held by them, because of their ready availability in that form and their thus lower cost.

The Westvaco's NUCHAR S-N ® activated carbon in Examples 3, 5 and 6 can be replaced by any other Westvaco activated carbon. For example, if the mat is to be used for adsorbing phenol, Westvaco's NUCHAR N-A ® (yielding an acid wash water when washed in water) would be beneficial because that acid grade manifests higher adsorption of phenol. The NUCHAR NS ® gives a neutral wash water.

Either of these two grades of activated carbon can be replaced by any of the others available, for example, DARCO ® available from I.C.I. (U.S.A.) Ltd., and the NORIT ® product of American Norit Co. The Barneby-Cheney activated carbon from pecan nut shells is highly effective, for example, in the adsorption of sulfur dioxide from a gas stream, for which it showed a very much greater adsorption capacity than an activated carbon from another source. Any other of the gas-adsorbing activated carbons from their various sources, for example, charcoal, coal, petroleum distillation residue or other nut shells, can be used. Thus, each of Examples 3, 5 and 6 is to be considered as if presented written out in full with its activated carbon replaced by any of these other activated carbons.

The mats of Examples 1 to 3 and 5 can be produced in large volume (e.g. commercial production basis) by one skilled in the paper making art by a paper making operation similar to that used in Example 6 with suitable changes required by differences in (i) the number of essential components such as occur from Examples 1 to 3, 5 and 6 and (ii) in the selected specific one of each of the individual essential components, and (iii) in the proportions of each, all in view of any very special use to be made of the planned mat. Some preliminary readily available experimenting may be needed, involving the preparation of some hand sheets in relation, for example, to web integrity, tensile strength and flow-rate.

The mat of Example 2 allowed twice the rate of flow (i.e. required half the time) as that of 3 sheets of Whatman ® No. 5 filter paper, through which filter paper 100 ml. of the Ponsol dye solution passed in 196 seconds and its filtrate showed 11 JTU turbidity.

A solution of 175 parts per million (i.e. ppm) of chloroform in distilled water was prepared and drawn by vacuum through a 9 cm. diameter (63.62 square cm.) disc of the mat of Example 6 held on a Büchner funnel. Analysis of the filtrate showed that it contained only 35 ppm of chloroform—a reduction of 80% after a single pass through a single thickness of the mat. Then also, the conventional treated water containing 37 parts of chloroform per billion (i.e. ppb) from a municipal water works was filtered through a 6 cm. diameter disc (clamped in the Seitz ® filter) of the mat of Example 6. The filtrate showed the chloroform content reduced to 5 ppb.

The following filtration tests were each separately conducted by vacuum filtration through its respective 9 cm. diameter discs of the mat of Example 6 held on a Büchner funnel.

The turbid, light tan taconite tailings effluent containing particles of amphibole asbestos from a mining company's operation yielded a clear filtrate showing a 99.5% removal of the asbestos particles.

The turbid, yellow, odorous aqueous waste effluent containing 250 ppb of polychlorinated biphenyl (PCB) from an industrial plant yielded a filtrate of only 1 ppb of the PCB.

The tap water containing polynuclear aromatic hydrocarbons (i.e. PAH) at a dyestuff plant, after filtration showed a 50% reduction in PAH.

An aqueous solution prepared to contain 10 ppm concentration of phenol showed after filtration a 70% reduction in phenol.

Each of the following aqueous streams was separately filtered through a 30.5 cm. diameter circular plate and frame filter press having 10 plates with each covered by a 30.5 square cm. diameter mat of Example 6. A stream of opaque, brown, odorous water directly from the lower Mississippi River after filtration gave a clear, colorless and odorless filtrate showing 99.5% reduction in coleiform count and also a 62% reduction of TOC.

A well water including an unidentified slime and used as boiler feed in an industrial plant (which water daily fouled the ion exchange bed) gave a fully clear, colorless and odorless filtrate (at 90.8 liters per minute) continuously in a 24 hour filtration test without any significant reduction in flow rate.

A colored, turbid and odorous aqueous effluent stream containing benzene, benzaldehyde, toluene and other mixed aromatic compounds, at a total organic carbon level of 2,320 ppm after a single pass through the filter press mats showed complete removal of color, turbidity and odor and a reduction in TOC level to 256 ppm.

A very hazy, turbid and odorous paper mill aqueous effluent containing minute cotton fibers and colloidal substances gave a continuous clear, colorless and odorless water filtrate.

Swimming pool water with turbidity that blocked seeing the bottom of the pool, in test filtration at 189 liters per minute provided continuously water constantly clear enough to enable seeing the bottom of the pool and which required only half of the prior used quantity of chlorine.

Other organic substances that can be adsorbed from waste waters by the activated carbon containing mats of the invention are such aromatic hydrocarbons as xylene, naphthalene, anthracene, chlorinated aromatics as chlorobenzene, polychlorinated biphenyls, phenols such as cresol, resorcinol and polyphenyls such as tannins and lignins, trichlorophenol, pentachlorophenol, high molecular weight aliphatic acids and aromatic acids such as tar acids, benzoic acid, 2,4-dichlorobenzoic acid, high molecular weight aliphatic amines and aromatic amines such as aniline, toluene diamine, high molecular weight straight and branched chain hydrocarbons and chlorinated hydrocarbons such as gasoline, kerosene, carbon tetrachloride, perchloroethylene, and high molecular weight ketones, esters, ethers and alcohols such as hydroquinone and polyethylene glycol.

A 100 ml. sample of a hazy white, equipment and containers wash water effluent from a dairy plant, taken at a point before treatment showed a turbidity of 135 JTU. This water was filtered through a pad composed of two 6 cm. diameter discs of (a) a mat prepared in accordance with the procedure of Example 3 from 6.8 gm. of cellulose, 4.6 cm. of polystyrene micro-bits, 0.85 gm. of polyester, and 4.6 gm. of the activated carbon, one such disc of (b) a mat made by the same procedure as for the mat (a) but with 15 gm. activated carbon, and 1 disc of (c) a mat prepared by the same procedure but from 3.4 gm. of cellulose, 2.9 gm. of the micro-bits, 0.43 gm. of the polyester, and 7.1 gm. of the activate carbon. The filtrate after 99 seconds was clear and colorless and had a turbidity reading of 3 JTU.

A second sample taken at the same time of the earlier effluent, after having passed through water treatment steps including the trickling filter, the setting lagoon and chlorination, was hazy brown with a sharp chlorine odor and showed a turbidity of 170 JTU on the Hach meter. 100 ml. of this sample was filtered through a pad composed of 2 of the discs of the above mat (b), 1 disc of the mat (a) and 1 disc of the mat (c). The filtrate obtained after 145 seconds was clear, colorless and odorless with a turbidity of 3 JTU.

100 ml. of intense yellow water containing 75 ppm. of 2,4-dinitrophenol and having a turbidity of 90 JTU were passed through two 6 cm. diameter discs cut from a mat composed of 6.8 gm. of cellulose fibers, 4.6 gm. of polystyrene micro-bits, 9.4 gm. of activated carbon, and 6.8 gm. of the TREVIRA polyester. The filtrate obtained in 24 seconds was colorless (5 JTU).

100 ml. of intense yellow water containing 75 ppm of the herbicide 2-methyl-4,6-dinitrophenol and having a turbidity of 75 JTU also was passed through two 6 cm. diameter discs of the same constitution as the one just above. The filtrate obtained in 24.8 seconds also was colorless (5 JTU).

The expression "flat wet stages" used in relation to the wet strength of the matrix in claim 1 line 14 and the corresponding part of the description of the invention in its considered broad scope, refers to those stages in the production of the matrix where it is being formed on the Fourdrinier screen and carried over on a felt through the water expressing presses and then over to complete the drying of the dryer drums (for example, as described in Example 5.

The diatomaceous earth included in the mats of the invention, such as the above-mentioned HI-FLOW SUPERCEL, is the finely divided kieselguhr.

While the invention has been explained by detailed description of certain specific embodiments of it, it is understood that various substitutions or modifications can be made in any of them within the scope of the appended claims which are intended to cover also equivalents of these embodiments.

What is claimed is:

1. A filter mat for removing particulate, colloidal or dissolved substances from a liquid containing same, said mat being in the form of a non-woven matrix consisting essentially of
   (i) from 10 to 95 weight percent of randomly arranged, irregularly intersecting and overlapping cellulose fibers,
   (ii) from 2 to 90 weight percent of polymer micro-bits produced from an expanded, thermoplastic polymer selected from the group of (a) a styrene-polymer, (b) a lower polyolefin, which is the polymer of an ethylenically unsaturated hydrocarbon monomer having from 2 to 6 carbon atoms, (c) a melt alloy of polyethylene with up to about 10 percent by weight of polystyrene, (d) a copolymer of propylene with from about 20 to about 30 percent by weight of ethylene, (e) a melt alloy composed of at least 50 percent by weight of polypropylene and the balance being a copolymer of ethylene with up to about 30 percent of said copolymer being vinyl acetate, and (f) a flexible foamed polyurethane, each said polymer being non-brittle in expanded form, said polymer micro-bits being substantially completely free of intact cells of the expanded polymer from which they are produced; and at least one of the following:
(iii) from about 1 to 10 weight percent of polyethylene terephthalate fibers; or
(iv) an adsorbing agent selected from the group of:
 (a") finely divided activated carbon in an amount of 70 weight percent or less;
 (b") diatomaceous earth in an amount below that at which undesirable dusting of diatomaceous earth from the mat can occur; and
 (c") colloidal alumina monohydrate in an amount sufficient for removing from an aqueous medium a significant portion of any chromic acid, dissolved dichromates and chromic salts contained in said medium, or a combination of two or more of said adsorbing agents.

2. A filter mat as claimed in claim 1 wherein the cellulose fibers and polymer micro-bits are in the form of a cobeat containing about one part of said polymer micro-bits and from about one to about two parts of said cellulose fibers.

3. A mat as claimed in claim 1 or 2, which includes fibers of a fiber-forming polyethylene terephthalate polyester substantially uniformly distributed in the mat and in an amount that jointly with the cellulose provides the mat with sufficient tensile strength in its proposed use.

4. A mat as claimed in claim 3, which includes finely divided activated carbon.

5. A mat as claimed in claim 3, which includes diatomaceous earth.

6. A mat as defined in claim 5, which includes finely divided activated carbon.

7. A mat as claimed in claim 3, which includes colloidal alumina monohydrate and in an amount below that at which undesirable dusting thereof from the mat can occur.

8. A mat as claimed in claim 7, which includes finely divided calcium carbonate in an amount about equal to that of the alumina monohydrate.

9. A mat as claimed in claim 3, wherein the micro-bits are those of a styrene-polymer.

10. A mat as claimed in claim 3, wherein the micro-bits are those of a polystyrene.

11. A mat as claimed in claim 3, wherein the micro-bits are those of a polyolefin.

12. A mat as claimed in claim 11, wherein the polyolefin is a copolymer of polypropylene with from about 20 to about 30 percent by weight of polyethylene.

13. A mat as claimed in claim 11, wherein the polyolefin is a melt alloy of polyethylene with up to about 10 percent by weight of polystyrene.

14. A mat as claimed in claim 11, wherein the polyolefin is a salt alloy composed, by weight, of at least 50 percent of polypropylene and the rest being a copolymer of polyethylene with up to about 30 percent of the copolymer being polyvinyl acetate.

15. A filter mat as claimed in claim 11 wherein the polyolefin is polyethylene.

16. A mat as claimed in claim 3, wherein the micro-bits are those of a polyurethane.

17. A filter mat for removing particulate, colloidal or dissolved substances from a liquid containing same, said mat being in the form of a non-woven matrix consisting essentially of
(i) from 10 to 95 weight percent of randomly arranged, irregularly intersecting and overlapping cellulose fibers; and
(ii) from 2 to 90 weight percent of polymer micro-bits produced from an expanded, thermoplastic polymer selected from the group of (a) a styrene-polymer, (b) a lower polyolefin, which is the polymer of an ethylenically unsaturated hydrocarbon monomer having from 2 to 6 carbon atoms, (c) a melt alloy of polyethylene with up to about 10 percent by weight of polystyrene, (d) a copolymer of propylene with from about 20 to about 30 percent by weight of ethylene, and (e) a melt alloy composed of at least 50 percent by weight of polypropylene and the balance being a copolymer of ethylene with up to about 30 percent of said copolymer being vinyl acetate, each said polymer being non-brittle in expanded form, said polymer micro-bits being substantially completely free of intact cells of the expanded polymer from which they are produced.

18. A filter mat as claimed in claim 17 wherein the cellulose fibers and polymer micro-bits are in the form of a cobeat containing about one part of said polymer micro-bits and from about one to about two parts of said cellulose fibers.

* * * * *

UNITED STATES PATENT AND TRADEMARK OFFICE
CERTIFICATE OF CORRECTION

PATENT NO. : 4,395,332
DATED : July 26, 1983
INVENTOR(S) : MAX KLEIN

It is certified that error appears in the above-identified patent and that said Letters Patent is hereby corrected as shown below:

Column 8, line 38 "ub" should be --in--;

Column 14, line 19, "NucharNS®" should be --NUCHAR S-N®--;

Signed and Sealed this

Fifteenth Day of May 1984

[SEAL]

Attest:

GERALD J. MOSSINGHOFF

Attesting Officer  Commissioner of Patents and Trademarks